United States Patent [19]

Walker, deceased et al.

[11] 3,852,486

[45] Dec. 3, 1974

[54] PROCESS OF PRESERVING SHELLFISH MEAT, AND PRODUCT OF SAID PROCESS

[76] Inventors: Eugene L. Walker, deceased, late of 1833 Ravenwood Dr., Concord, Calif. 94520 Joan E. Walker, admistratrix; Antoine R. Ferrandini, deceased, late of 337 Laurel Pl., San Rafael, Calif. 94901 Suzanne W. Ferrandini, executrix

[22] Filed: Nov. 30, 1970

[21] Appl. No.: 93,830

Related U.S. Application Data

[63] Continuation-in-part of Ser. Nos. 615,333, Feb. 13, 1967, abandoned, and Ser. No. 665,959, Sept. 7, 1967, abandoned.

[52] U.S. Cl. ............... 426/129, 426/131, 426/326, 426/332, 426/335, 426/407
[51] Int. Cl. .......................... A23b 3/00, A23b 3/01
[58] Field of Search ...... 99/111, 158, 160; 426/129, 426/131, 326

[56] References Cited
UNITED STATES PATENTS

| | | | |
|---|---|---|---|
| 2,538,310 | 1/1951 | Hansen | 99/160 |
| 2,546,428 | 3/1951 | Byrd | 99/195 |
| 2,622,030 | 12/1952 | Frandsen | 99/155 |
| 2,687,356 | 8/1954 | Fraticelli | 99/111 |
| 3,007,802 | 11/1961 | Osakabe | 99/195 |

OTHER PUBLICATIONS

Farber et al., "A Study of Pasturization as a Means of Extending the Low–Temperature Storage Life of Dungenus Crab and Shrimp," 1968, Seafood Research Laboratory, C. W. Hooper Foundation, University of Cal., San Francisco Med. Center, San Francisco, Cal.

*Primary Examiner*—Raymond N. Jones

[57] ABSTRACT

Process of treating fresh, cooked shellfish meat by pasteurization after treatment with aqueous solution of sodium chloride, antibacterial agent and strong organic acid. A novel product is produced in the form of a pasteurized shellfish meat, impregnated with the aforesaid solution and sealed from the atmosphere.

19 Claims, No Drawings

PROCESS OF PRESERVING SHELLFISH MEAT, AND PRODUCT OF SAID PROCESS

This application is a continuation-in-part of our copending application Ser. No. 615,333 filed Feb. 13, 1967, and Ser. No. 665,959, filed Sept. 7, 1967, both now abandoned.

This invention relates to a method of heat treating and packaging the meat of shellfish and, more particularly, to a method for obtaining rapid processing and volume production in heat treating freshly cooked meat of shellfish. The invention also relates to the product of the process.

Under previous methods, the marketing of many types of shellfish, for example the Dungeness crab which is indigenous to the Pacific Coast of the United States, has been restricted largely to that which can be sold as fresh meat. Freezing sharply reduces the quality of many forms of shellfish and frozen crab meat is a comparatively poor product which deteriorates rapidly.

Despite this, millions of pounds must be frozen each year in order to derive maximum production for the highly seasonal product. This places an extreme burden on the industry to predict future demand with reasonable accuracy in order to minimize the amount of frozen crabmeat which must be discarded or sold at greatly reduced prices.

Moreover, while it is true that much of the meat may be preserved for longer periods of time by canning processes, the changes that occur in shellfish, especially crabmeat, which is subjected to relatively high temperatures and long cooking times during canning, result in a product in which consumer interest has not been successfully generated. Moreover, frozen canned crabmeat and canned pasteurized crabmeat present a real hazard to those consumers who are unaware that crabmeats so prepared must be kept under refrigeration even though canned.

It is true that some shellfish, such as certain shrimp, retain their quality when frozen, but freezing does not destroy pathogenic organisms such as salmonella, E. coli, staphylococci, etc. Enormous quantities of imported frozen cooked and peeled shrimp have been seized and destroyed because of contamination, and as a result imports of frozen shrimp from Japan, Korea and India have been drastically reduced or discontinued.

Considerable experimental work has been performed by government and industry food chemists and technologists in an effort to derive methods of preserving the meat from shellfish without freezing, without boiling and without conventional canning processes requiring sterilization. However, these efforts have, prior to the present invention, produced little more than laboratory empirical findings and they have not been developed into a practical, commerically profitable industrial process. An example of the limited progress in the development of such a process is evidenced by Byrd U.S. Pat. No. 2,546,428, granted Mar. 27, 1951. There, the patentee recognizes the desirability of heating the shellfish meat in order to destroy bacteria, but he does not come to grips with considerations which would render the process feasible for the preservation, packaging and distribution of shellfish meat for the consumer market. More specifically, pasteurization does not kill the spores of Cl. botulinum, and if pasteurized shellfish meat is allowed to rise in temperature to 40° F (which is very likely to occur under commerical conditions) there is a real danger of growth of Cl. botulinum spores and of the development of the toxin incident to such growth.

Modern day distribution methods for refrigerated products are gradually improving but it is generally recognized that they are still far from adequate. There is no certainty that constant temperatures will or can be maintained. Breakdowns occur in refrigeration systems; delivery trucks lose their refrigeration; wholesalers are careless at times of their storage temperatures and it is not uncommon to find temperatures of 50° F and above in retail market display cases.

It is an object of the present invention to provide an improved and reliable method of preserving shellfish meat.

It is a further object of the invention to provide a process whereby shellfish meat can be subjected to pasteurization to kill not only pathogenic organisms which can be killed by conditions of pasteurization, but which will inhibit the growth of Cl. botulinum under conditions of mild refrigeration such as temperatures up to and even above 40° F.

It is a particular object of the invention to provide a process of pasteurizing shellfish meat which is safe and dependable in inhibiting growth of Cl. botulinum even under adverse conditions such as are likely to be encountered.

Yet another object of the invention is to provide a novel, packaged shellfish product which may be stored over extended periods of time under conditions of mild refrigeration without growth of the spores of Cl. botulinum and which may be safely frozen and then thawed and stored under conditions of mild refrigeration.

It is a further object of the invention to provide a product free of any potential health hazard, even at carelessly controlled temperatures, that can be processed rapidly and economically in large volume and can be safely distributed to the consuming public under present marketing conditions.

The above and other objects of the invention will be apparent from the ensuing description and the appended claims.

In accordance with the present invention, shellfish meat (e.g., crabmeat, shrimp meat, oyster meat, clam meat and lobster meat) is first cooked. This may be accomplished in the usual way, as by submerging fresh shellfish in vats or tanks of cooking water for appropriate periods of time depending on species and size, such being done in accordance with well known practice. This cooking makes the meat edible and it destroys harmful surface bacteria, shrinks meat away from the shell and facilitates removal of the meat from the shell by hand or by mechanical means; also it removes certain of the moisture from the meat which facilitates absorption of the treating solution described below. If cooked shellfish meat is otherwise available, this initial step may be omitted provided the cooked meat has not deteriorated to an unacceptable degree as regards taste, spoilage and toxicity.

This cooked but otherwise fresh shellfish meat, whether prepared as the first step in the process of the present invention or provided as such, may then be typically treated as follows: The meat is placed in stainless steel wire mesh containers and dipped for about two minutes in a cold water bath containing about 100 ppm of chlorine. This step prevents or diminishes the transfer of harmful bacteria from the shells (which are more likely than the meat to be contaminated by bacteria including *Cl. botulinum*) to the meat. Then the meat, while still in the mesh and after drainage of the chlorine bath is submerged in a treating solution which is an aqueous solution of an inorganic chloride (preferably sodium chloride), an antibacterial agent and a strong organic acid. Since these ingredients penetrate and remain in the meat, they sould be non-toxic and preferably approved food additives approved by the U.S. Food and Drug Administration.

The chloride may be sodium chloride, potassium chloride or calcium chloride. Sodium chloride is preferred because of its cheapness and effectiveness and because it is an approved food additive which, in the amounts used in accordance with the present invention, does not detract from the flavor of the product.

The sodium chloride appears to function, in the amount employed (see below) as an inhibitor of the growth of bacteria and particularly of *Cl. botulinum*. In small amounts, e.g., 2 percent by weight or less, it functions as an essential ingredient for the growth of such organisms, but in the amount used in the practice of the present invention it functions as an inhibitor of such growth, or in any event it does not promote such growth and is therefore suitable for purposes of the present invention. It is preferably employed in an amount of about 2½ to 3 percent by weight of the treating solution. More than about 3 percent may be employed but does appear to confer any benefits and may give the product an undesirable salty taste. Enough should be used to function as an inhibitor of growth of micro-organisms, particularly bacteria such as commonly are found in products of this type, and preferably it is used in an amount of not less than 2½ percent by weight of the solution.

The antibacterial agent may be any of a large group of bactericidal or bacteriostatic agents which are acceptable as food additives. This agent is used in a concentration sufficient to have a substantial bacteriostatic effect. Examples of suitable antibacterial agents are as follows: sodium nitrite, sodium nitrate, sodium benzoate, potassium nitrite, potassium nitrate, potassium benzoate, benzoic acid, nisin, trypsin, ammonia, hydrogen peroxide, streptomycin, penicillin and chlorterramycin. Certain of these are not presently permitted by law in the United States as food additives. Any antibacterial or bacteriostatic agent may be employed if it is effective against pathogenic organisms such as Salmonella, *E. coli* and *staphylococci* which are likely to contaminate shellfish meat. This agent is preferably one which is permissible as a food additive. The preferred antibacterial agents are sodium benzoate, sodium nitrite and nisin. The concentration of antibacterial agent in treating solution should be sufficient for the purpose, that is, to inhibit bacterial growth under conditions of mild refrigeration over a substantial period of time, (e.g., to reduce bacterial growth to an insubstantial degree for a period of three to four months when the product is stored at 32° to 40° F.)

Examples of suitable strong, non-toxic organic acids are citric, ascorbic, fumaric, malic and chloracetic acids. Hydrochloric acid may also be used. As in the case of the other additives, an acid which is acceptable as a food additive is preferred. Any other organic acid which is non-toxic to human beings when ingested as a food product, and which at an acceptable concentration provides a pH of not less than about 3 to 5 is adequate. Enough of this acid should be used to lower the pH of the treating solution to about 5 or less. With a very strong acid such as chloracetic or hydrochloric, preferably only enough is added to bring the pH to about 3 to 5. A highly acid solution e.g., pH much less than 3, is not as desirable as a pH of 3 to 5 because a lower pH is no more effective for purposes of the present invention and because a lower pH has a dehydrating effect and makes the meat tougher.

Examples of suitable formulations of treating solutions are as follows:

Formula I — In a 240 gallon dip tank add enough sodium chloride salt to obtain a 3 percent solution (60 lbs.). Then, prepare a mixture of 50 percent sodium benzoate and 50 percent fumaric acid and add 16 ozs. in liquid measure of this compound to the 240 gallon solution.

Formula II — To a tank of cold water add enough salt to obtain a 3 percent solution. Then prepare a mixture of 50 percent of sodium nitrite and 50 percent citric acid, and add 8 ozs. by liquid measure to the water tank.

Contact between the cooked meat and the treating solution described above is brought about by any suitable means, e.g., by placing or retaining the cooked meat in a strainer basket, submerging the meat in the treating solution, holding the meat submerged in the solution long enough to insure a uniform penetration of the meat by the treating solution, and then removing the basket and allowing the meat to drain. Usually a time of about 5 to 10 minutes is adequate. Penetration is accelerated by having the meat in small pieces, e.g., not exceeding about 1 inch in thickness. This treating step is preferably carried out at about room temperature. As noted above, the initial cooking step removes some moisture from the meat and facilitates penetration of the treating solution into the meat.

Next the treated meat is subjected to pasteurization, i.e., to heat sufficient to bring the temperature of the meat uniformly to about 150° to 210° F, preferably about 180° to 210° F. This pasteurization step may be carried out in various ways and heat may be applied in various ways. It is important that the treating solution which has been caused to penetrate the meat not be leached out of the meat during or after pasteurization. Therefore, the pasteurizing step should be carried out in such a way as to avoid washing or leaching the meat and removing all or a substantial part of the treating solution which impregnates the meat. Thus the meat, preferably immediately after treating with the treating solution and draining, is placed in a suitable container which is effective to seal the meat against entry of contaminants such as water that is used as the heating medium, etc. For example, the meat recovered from the step of impregnating with treating solution may be placed in plastic bags which are then sealed as by heat sealing. The bags may be made of opaque or transparent (preferably transparent) plastic material which is resistant to penetration by moisture and is resistant to the degree of heat employed, such bags being of a type that are readily heat sealed and which act to seal the contents from the atmosphere, from water, etc. Where the means of heating as by the use of hot water, is such that penetration of heat is from the outside to the interior of the meat, the meat is preferably packaged in thin packages to present a large surface area per volume of meat to the external heating medium. Other suitable heating media are radiant heaters such as infrared lamps, heating coils, steam ducts, etc. We have found in a typical case of processing Dungeness crab that heating times required (where the meat is placed in plastic packages) and for conventional canning methods (where the meat is placed in cylindrical metal cans) compare as in Table I below.

Table I

| Weight of Contents | Method of Present Invention | | Method of Prior Art | |
|---|---|---|---|---|
| | Internal Temperature Brought to 180° F | | | |
| | Thickness | Time | Can Size Dia. & ht. shown | Time |
| 4 oz. | ¼ inch | 9 min. | — | — |
| 8 oz. | ½ inch | 14 min. | No. 1 (3-7/16 D × 2-3/16 h) | 57 min. |
| 16 oz. | 1 inch | 22 min. | No. 2 (3-7/16 D × 4-9/16 h) | 73 min. |
| 40 oz. | 1½ inch | 32 min. | No. 5 (5-1/8 D × 5-5/8 h) | 105 min. |
| 80 oz. | 2 inches | 47 min. | No. 10 (6-3/16 D × 7 h) | 200 min. |
| | Internal Temperature Brought to 170° F | | | |
| 4 oz. | ¼ inch | 7 min. | — | — |
| 8 oz. | ½ inch | 12 min. | No. 1 (3-7/16 D × 2-3/16 h) | 47 min. |
| 16 oz. | 1 inch | 17 min. | No. 2 (3-7/16 D × 4-9/16 h) | 63 min. |
| 40 oz. | 1½ inch | 25 min. | No. 5 (5-1/8 D × 5-5/9 h) | 95 min. |
| 80 oz. | 2 inches | 42 min. | No. 10 (6-3/16 D × 7 h) | 190 min. |

It is apparent, from the above table, that our invention reduces the necessary heat treating time to one-third or one-fourth the time required by other methods — thereby making it economical and practical to obtain volume production at greatly reduced cost in commercial operations.

Where flat packages are employed to accelerate penetration of heat, the quantity of meat may be expressed in terms of the relationship between the thickness and the total mass. For example, with the packages above described, the ratios between thicknesses in inches and weights in ounces is as follows:

| 4 oz. | ¼ inch thick | 16 to 1 |
| 8 oz. | ½ inch thick | 16 to 1 |
| 16 oz. | 1 inch thick | 16 to 1 |
| 40 oz. | 1½ inch thick | 26 to 1 |
| 80 oz. | 2 inches thick | 40 to 1 |

If the means of applying heat to accomplish pasteurization is one which acts internally on the meat substantially as fast as on the surface of the meat, flat configurations are not as important. In such cases thicker plastic packages or conventional glass containers may be used.

Pasteurization can be carried out in this manner by available microwave techniques and apparatus, for example that supplied by Varian Associates of Palo Alto, Calif. This process and apparatus for use in the process are described in a publication of Varian Associates by Dr. Carl M. Olsen entitled "Promising Applications of Microwave Energy in the Food and Pharmaceutical Industry," such having been presented at the 1968 Varian Industrial Microwave Technology Seminar, Jan. 25 and 26, 1968. Such technique is in commercial usage and is well known in the food processing industry. Exposure of shellfish meat to microwave energy at power levels recommended by the manufacturer of the equipment for short periods of time, e.g., 2 to 3 minutes will bring the temperature of the entire body of meat to the requisite temperature, e.g., 180° F, very quickly and will accomplish pasteurization. Cooked shellfish meat, preferably given a chlorine treatment as described above and impregnated with the treating solution as described above, is placed in packages, for example plastic bags or envelopes or in glass containers, but the packages or containers are left unsealed. The reason for leaving the containers unsealed is to prevent the rapid expansion of air (which is due to the very rapid rate of heating) from bursting the containers or creating leaks in the containers. Exposure of the containers to such treatment results in a very rapid heating of the meat including interior portions of the meat, even when present in relatively large bodies as in conventional glass containers. Pasteurization can be accomplished in approximately three to four minutes. The containers are sealed immediately after pasteurization, for example by heat sealing of plastic envelopes or applying the lids to glass containers. Such sealing is preferably carried out in automated sterile sealing equipment, for example automatic heat sealing equipment in the case of plastic packages and automatic capping equipment in the case of glass containers. The product is chilled to 40° F or below, preferably within 1 to 1½ hours after pasteurization. As noted above, the meat may be frozen.

In the practice of the invention, pasteurization is carried out at temperatures and for a time sufficient to kill pathogenic bacteria, but insufficient to degrade flavor to an unacceptable degree and to remove so much moisture from the meat as to make it stringy. Such overpasteurization will oftentimes become apparent through condensation of moisture within the container, such moisture having been evaporated from the meat as the result of overpasteurization.

Whatever the means of pasteurization, the meat is held at the pasteurization temperature for a time sufficient to effect pasteurization, which will vary with the species. Typical pasteurization times (i.e., periods of time that the meat is held at pasteurization temperatures) are as follows: 8 ounce packages ½ inch thick, 14 minutes in 190° F hot water (internal temperature of 180° F): one pound packages, 22 minutes in 190° F hot water bath (internal temperature of 180° F). Then the meat is preferably cooled to room temperature or lower and is placed in refrigerated storage equipment and maintained at a temperature not exceeding 50° F, preferably not exceeding about 40° F, but above freezing, i.e., about 32° F. If desired, the shellfish meat may be frozen and, when thawed, it can be stored for long periods of time under conditions of mild refrigeration without deterioration or the growth of bacteria.

As described above, the treating solution contains a chloride component such as sodium chloride, an antibacterial component such as sodium benzoate, and an acid component such as citric acid. By using all three components best results are obtained. Improvement can be obtained with two of these components, but much better results are obtained with all of them, as will be seen from the following table and Example 1. The data will also illustrate the importance of retaining the treating solution in the meat, and hence the importance of avoiding contact of the meat with water, even sterile water, which would have the effect of leaching out the impregnating solution.

Example 1 — Two lots of Dungeness crab meat were employed. Both had been given preliminary processing including chlorine treatment as described above. Lot 1 was impregnated with an aqueous solution of 3.2 percent sodium chloride and 0.1 percent citric acid (pH of the solution was 3.5).

Lot 2 was impregnated with an identical solution which, however, contained 0.1 percent of sodium benzoate. That is to say, the meat of Lot 1 was treated with a solution containing only sodium chloride and citric acid, whereas Lot 2 was treated with a solution containing sodium chloride, an antibacterial agent and acid. The meat of both lots was treated in the same manner (and as described above) with the respective treating solutions and was then pasteurized as described above, packaged in sealed plastic containers and immersed in water at 190° F for 14 minutes. Both lots of meat were delivered to a laboratory in sealed, pasteurized, impregnated condition. Each lot was then divided into two sub-lots (sub-lots 1A, 1B, 2A and 2B). These sub-lots were then treated as follows: Lots 1A and 2A were washed with two ounces of sterile water; Lots 1B and 2B were left unwashed. Then each lot was inoculated with 50,000 spores each of Type E, Boluga and Saratoga strains of *Cl. botulinum* and incubated at 74° F for 11 days. Each lot was sampled at 4, 7 and 11 days, with the results as set forth in Table II below.

Table II

| Lot No. | Days incubated | Presence of Toxin |
| --- | --- | --- |
| 1A | 4 | negative |
| 1B | 4 | negative |
| 2A | 4 | negative |
| 2B | 4 | negative |
| 1A | 7 | positive |
| 1B | 7 | negative |
| 2A | 7 | negative |
| 2B | 7 | negative |
| 1A | 11 | positive |
| 1B | 11 | positive |
| 2A | 11 | positive |
| 2B | 11 | negative |

At the end of 11 days, Lots 1A, 1B and 2A were all gassy and had a cheesy odor characteristic of *Cl. botulinum*, Type E spoilage, and under the microscope were observed to have very many vegetative cells resembling *Cl. botulinum*. Lot 2B showed no gas after 11 days and had very few vegetative cells. Mouse inoculations proved the absence of toxin development. All of the lots (including 2B) produced growth of *Cl. botulinum* after washing with distilled water (which removed the treating solution).

These results illustrate the superior effectiveness of the three component solution (salt, sodium benzoate and citric acid) and the fact that the continued presence of this solution in the meat maintains its non-toxic character and prevents the growth of *Cl. botulinum*. Thus only Lot 2B (which had been treated with the three component solution and which had not been subjected to the leaching action of water) remained free of *Cl. botulinum* and its toxin and the gross indications of the same. As noted, even Lot 2B developed toxin after washing it and extracting the treating solution.

It will be apparent that a novel and useful means of processing shellfish meat has been provided.

We claim:

1. A shellfish meat product comprising shellfish meat that has been cooked to a degree such that it is edible and which is in pasteurized condition, said cooked, pasteurized shellfish meat being impregnated with an aqueous solution, said solution being an aqueous solution of (a) a chloride, (b) an antibacterial agent other than said chloride (a), and (c) a strong organic acid capable of producing an aqueous solution of pH less than about 5; said chloride (a) being selected from the group consisting of sodium chloride, potassium chloride and calcium chloride, said antibacterial agent (b) and acid (c) being non-toxic for human consumption; said chloride (a) being present in an amount not less than 2.5 percent; said antibacterial agent being present in amount sufficient to inhibit growth of bacteria in the shellfish meat; said acid (c) being present in sufficient amount to produce a pH of about 5 or less; said impregnated shellfish meat being enclosed in a container which serves to prevent access of ambient organisms and loss of said aqueous solution.

2. The product of claim 1 wherein the chloride (a) is sodium chloride.

3. The product of claim 1 wherein the antibacterial agent (b) is sodium benzoate.

4. The product of claim 1 wherein the antibacterial agent (b) is sodium nitrite.

5. The product of claim 1 wherein the acid (c) is citric acid.

6. The product of claim 1 wherein the chloride (a) is sodium chloride; the antibacterial agent (b) is selected from the group consisting of sodium benzoate, sodium nitrite and nisin; and the acid is citric acid.

7. The product of claim 6 wherein the container is a plastic envelope.

8. The product of claim 6 wherein the container is a glass container.

9. The product of claim 6 in which the shellfish meat is crabmeat.

10. The product of claim 6 wherein the shellfish meat is shrimp.

11. A method of preserving shellfish meat which comprises providing shellfish meat that has been cooked to a degree that it is edible, impregnating the cooked shellfish meat with an aqueous solution of a chloride (a), an antibacterial agent (b) other than said chloride (a), and an acid (c), said chloride (a) being selected from the group consisting of sodium chloride, potassium chloride and calcium chloride and being present in an amount not less than 2.5 percent, said antibacterial agent (b) being non-toxic for human consumption and being present in an amount sufficient to inhibit the growth in the shellfish meat of bacteria and said acid (c) being non-toxic for human consumption and being present in an amount sufficient to provide a pH not greater than about 5; sealing the shellfish meat after impregnation and pasteurizing the shellfish meat under conditions such that the impregnating solution is not leached out during the pasteurization process.

12. The method of claim 11 wherein pasteurization is carried out by contact of the impregnated shellfish meat in a sealed container with hot water.

13. The method of claim 11 wherein pasteurization is carried out by exposure of the meat to radiant heat or microwave and the meat is sealed after pasteurization.

14. The method of claim 11 wherein the chloride is sodium chloride.

15. The method of claim 11 wherein the antibacterial agent is sodium benzoate.

16. The method of claim 11 wherein the acid is citric acid.

17. The method of claim 11 wherein the chloride is sodium chloride, the antibacterial agent is sodium benzoate, and the acid is citric acid.

18. The method of claim 11 wherein the shellfish meat is crabmeat.

19. The method of claim 11 wherein the shellfish meat is shrimp.

* * * * *